United States Patent [19]

Kapp et al.

[11] Patent Number: 5,412,526
[45] Date of Patent: May 2, 1995

[54] SURGE ARRESTER CIRCUIT AND HOUSING THEREFOR

[75] Inventors: Wilhelm H. Kapp, Goleta; Derek J. Foster, Santa Barbara; Wayne R. Derossett, Goleta, all of Calif.

[73] Assignee: Square D Company, Palatine, Ill.

[21] Appl. No.: 15,764

[22] Filed: Feb. 10, 1993

[51] Int. Cl.[6] .................... H02H 3/20; H02H 9/06
[52] U.S. Cl. ..................... 361/56; 361/111; 361/127
[58] Field of Search .............. 361/56, 91, 104, 111, 361/118, 119, 127; 324/507, 550, 556; 340/638

[56] References Cited

U.S. PATENT DOCUMENTS

| | | | |
|---|---|---|---|
| 4,152,743 | 5/1979 | Comstock | 361/56 |
| 4,740,859 | 4/1988 | Little | 361/56 |
| 4,866,560 | 9/1989 | Allina | 361/104 |
| 5,010,438 | 4/1991 | Brady | 361/56 |

Primary Examiner—Jeffrey A. Gaffin
Assistant Examiner—Ronald W. Leja
Attorney, Agent, or Firm—Larry I. Golden; Kareem M. Irfan

[57] ABSTRACT

The present invention provides a circuit for limiting voltage surges in load centers, panelboards and other electrical distribution devices. The circuit includes at least one high potential terminal adapted for connecting to at least one corresponding service line and a low potential terminal adapted for connecting to a low potential means. The circuit also includes a plurality of varistors connected in parallel to one another between each high potential terminal and the low potential terminal and a plurality of fuses corresponding in number to the plurality of varistors. Each fuse is connected in series to one of the varistors. Each fuse opens the circuit therethrough upon failure of the associated varistor. The circuit further includes monitoring the status condition of the fuses.

28 Claims, 2 Drawing Sheets

SURGE ARRESTER CIRCUIT AND HOUSING THEREFOR

FIELD OF THE INVENTION

The present invention relates generally to a protection circuit and, more particularly, to a circuit that protects other circuits and electrical distribution devices from voltage surges across a service line.

BACKGROUND OF THE INVENTION

In electrical power distribution devices, circuit interrupters such as circuit breakers are used to protect power lines and other distribution devices from excessive current flows. The loads connected to these distribution devices must also be protected from voltage surges. Surge arresters suppress voltage surges to a less damaging level by presenting a decrease in impedance upon higher voltages. The resulting low impedance circuit effectively limits surge currents flowing through the distribution devices so that they are not damaged by the surges.

Surge arresters in the prior art have problems with overshooting the preselected voltage level before the overvoltage is suppressed. The voltage overshoot risks damage to the devices which the surge arrester is to protect. Some prior art surge arresters utilize poorly designed fusing methods which can create the potential of explosion or fire.

To complicate matters further, the space allocated to surge arrester circuitry in load centers and panelboards makes it difficult to package enhanced functionality accessories in the available space. Thus, the placement of the protective circuitry is a problem that must be overcome.

SUMMARY OF THE INVENTION

In accordance with the present invention a circuit for limiting voltage surges across a service line in an electrical distribution device is provided. The circuit includes at least one high potential terminal adapted for connecting to at least one corresponding high potential line and a low potential terminal adapted for connecting to a low potential means. The circuit also includes a plurality of varistors connected in parallel to one another between each high potential terminal and the low terminal. A plurality of fuses correspond in number to the plurality of varistors. Each fuse is connected in series to one of the varistors. Each fuse opens the circuit therethrough upon failure of the associated varistor. The circuit further includes means for monitoring the status condition of the fuses. The monitoring means electrically connects to the fuses.

The present invention also provides for a circuit for limiting voltage surges across a service line in a multiphase load center, panelboard or the like. The circuit includes at least two high potential terminals adapted for connecting to at least two corresponding high potential lines and a low potential terminal adapted for connecting to a low potential means. A first plurality of varistors is connected in parallel to one another between the first high potential terminal and the low potential terminal. A first plurality of fuses corresponding in number to the first plurality of varistors is also provided. Each fuse is connected in series to one of the varistors. Each fuse opens the circuit therethrough upon failure of the associated varistor. A second plurality of varistors is connected in parallel to one another between the second high potential terminal and the low potential terminal. A second plurality of fuses corresponding in number to the second plurality of varistors is also provided. Each fuse is connected in series to one of the varistors. Each fuse opens the circuit therethrough upon failure of the associated varistor. The circuit also includes means for monitoring the status condition of the fuses.

Also provided in accordance with the present invention is a surge arrester for use with a service line within an electrical distribution device. The surge arrester includes a housing made of an electrically insulating material. The housing has a base adapted for connection with the distribution device. The arrester includes at least one high potential terminal adapted for connecting to at least one corresponding high potential line. Each high potential terminal extends through the housing. A low potential terminal is adapted for connecting to a low potential means. The low potential terminal extends through the housing. A plurality of varistors are enclosed within the housing and connect in parallel to one another between each input terminal and the low potential terminal. A plurality of fuses are also enclosed within the housing and correspond in number to the plurality of varistors. Each fuse is connected in series to one of the varistors. Each fuse opens the circuit therethrough upon failure of the associated varistor. The arrester also includes means for monitoring the status condition of the fuses. The monitoring means is enclosed within the housing with a display externally discernable.

Accordingly, an object of the present invention is to provide a protective circuit against voltage surges in load centers, panelboards, and other electrical distribution devices.

Another object of the present invention is to provide a protective circuit which limits voltage overshoot and a lower clamping level for voltage surges.

A further object of the invention is to provide a circuit which offers redundant voltage surge protection and prevents explosion or fire hazards upon failure.

Yet another object of the invention is to provide a surge arrester which can used with load centers, panelboards, and other electrical distribution devices which are already operating in the field.

A still further object of the invention is to provide a surge arrester which reduces lead inductance and provides superior protection characteristics compared to the prior art.

Another object of the invention is to provide a surge arrester which monitors and displays the status condition of the surge voltage protection.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure.

DETAILED DESCRIPTION

Figure 1:
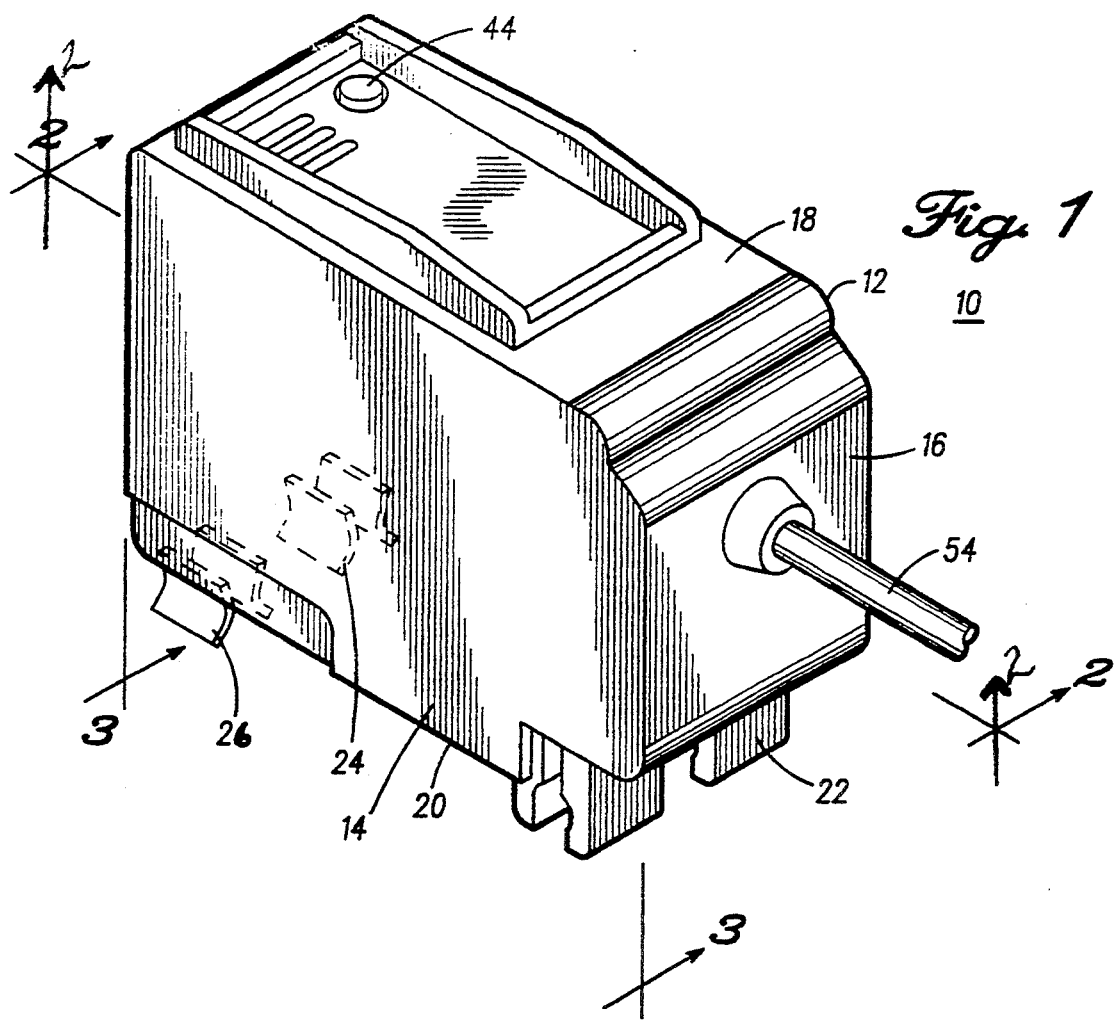
FIG. 1 is a perspective view of an embodiment of the present invention illustrating a two-pole surge arrester for engaging a load center.
Figure 2:
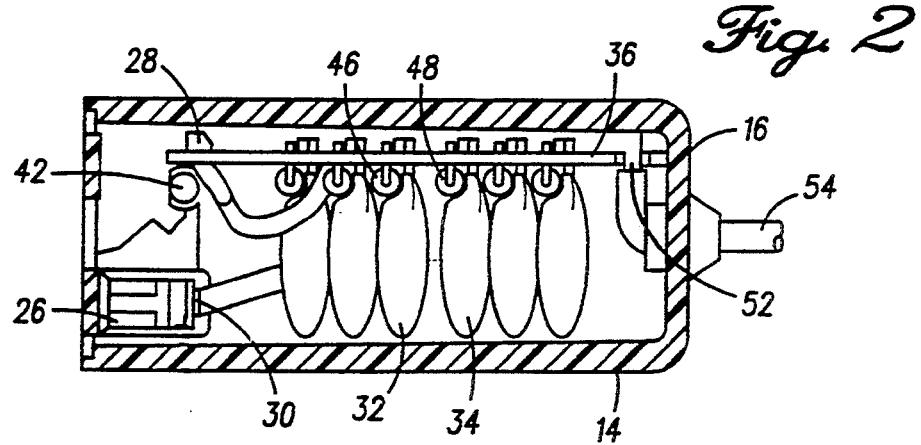
FIG. 2 is a top cross-sectional view of the surge arrester in FIG. 1 taken along lines 2—2 just inside the top wall of the housing.
Figure 3:
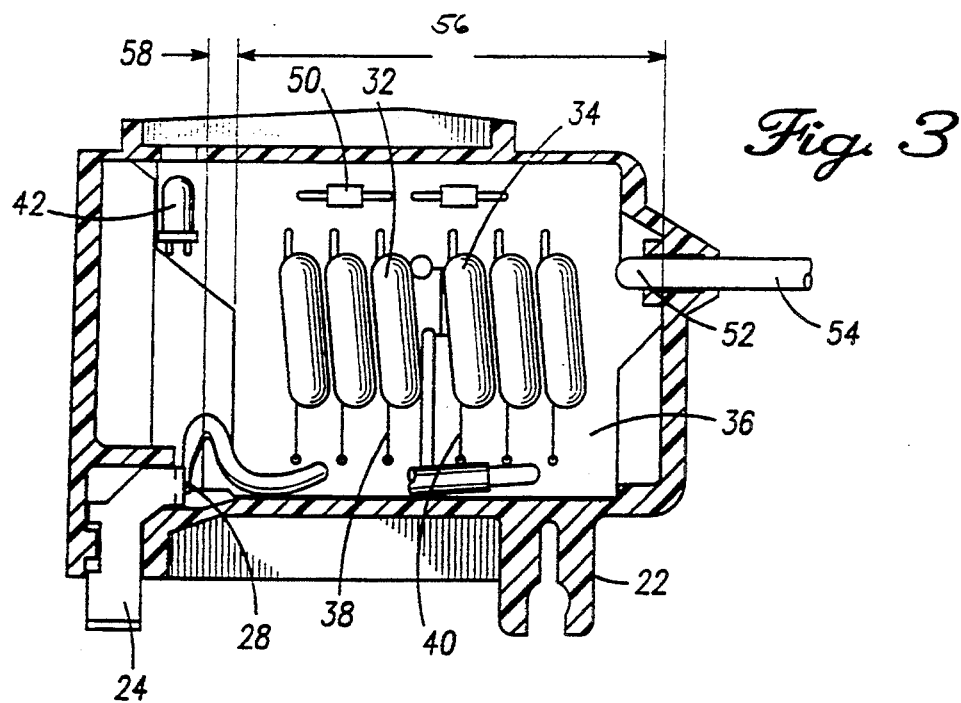
FIG. 3 is a side cross-sectional view of the surge arrester in FIG. 1 taken along lines 3—3.

Turning now to the drawings and referring initially to FIGS. 1, 2 and 3, a surge arrester is illustrated and generally designated by reference numeral 10. The surge arrester 10 provides a housing 12 defined by side walls 14, end walls 16, a top wall 18, and a bottom wall 20.

Formed with the bottom wall 20 is a pair of mounting prongs 22. The surge arrester 10 mounts to the rails of a load center or panelboard (not shown) by placing the mounting prongs 22 on the load center rail.

Two pairs of contact jaws 24 and 26 are provided which extend through the bottom wall 20. The contact jaws 24, 26 are sized to make mechanical and electrical connection with the line bus bars of the load center (not shown).

A first and second high potential terminal 28 and 30, respectively connect to the pairs of contact jaws 24 and 26. The high potential terminals 28, 30 are adapted to connect to the high potential lines from the load center. The contact jaws 24, 26 are the particular adaption of this connection illustrated in the embodiment 10.

The housing 12 encloses two sets of three varistors 32 and 34 which are mounted on a printed circuit board 36. The first and second high potential terminals 28, 30 are respectively connected to the first and second set of varistors 32, 34. The three varistors like 32 are electrically connected in parallel with one another.

The two sets of varistors 32, 34 are electrically connected with a first and second set of fuses 38 and 40, respectively, similarly mounted on the circuit board 36. Each fuse, like 38, is electrically connected in series with one varistor, like 32. The value of the fuse is preselected to open when the varistor fails.

A light emitting diode 42 is mounted on the circuit board 36 and is visible through an opening 44 in the top wall 18 of the housing. The light emitting diode 42 is electrically connected to each set of varistors 32 and 34 and provides for monitoring the status condition of the varistor and fuse pairs. The light output of the light emitting diode 42 varies with the operating condition of each varistor and fuse pair.

The light output of the light emitting diode 42 is controlled by two sets of resistors 46 and 48 mounted on the circuit board 36 and respectively connected to the first and second set of varistors 32, 34. Specifically, one end of each resistor like 46 is electrically connected between the fuse 38 and the varistor 32. The opposite end of the resistor 46 is connected to one end of a resistor 50 which is electrically connected in parallel to the light emitting diode 42. Similarly, the opposite end of each resistor like 48 of the second set of resistors electrically connects to the diode and then to the other end of resistor 50 which is in parallel with the light emitting diode 42. Each set of resistors like 46 creates a resistance ladder to develop a voltage across resistor 50 proportional to the number of conducting fuses like 38, 40. The intensity of the light emitting diode 42 decreases slightly when a fuse opens up. When only a preselected number of varistor and fuse pairs remain operational, the light emitting diode 42 will extinguish entirely to signal for replacement of the surge arrester 10.

Each varistor like 32, 34 electrically connects on the end opposite the associated fuse 38, 40 to a low potential terminal 52. The low potential terminal 52 is attaches to a wire lead 54 extending through the end wall of the housing. The wire lead 54 provides for connection to a low potential means (not shown). In a multiphase load center, the low potential means is usually the neutral conductor. The present invention can also be connected to a ground as the low potential means.

The internal area of the housing 12 indicated by arrow 56 is filled with a current limiting arc suppression media to prevent flashover across the circuit board 36 when the fuses like 38, 40 open. Preferably, an electrical grade silica is used. Other types of arc suppression media are also suitable.

The other internal area of the housing 12 indicated by arrow 58 is filled with a sealing material to prevent contamination by moisture and pollutants. Preferably, an epoxy is used as the sealant although other materials are suitable.

The housing 12 itself can be made from any electrically insulating material. Preferably, a thermoplastic material provides the necessary properties like flame resistance and structural integrity.

Figure 4:
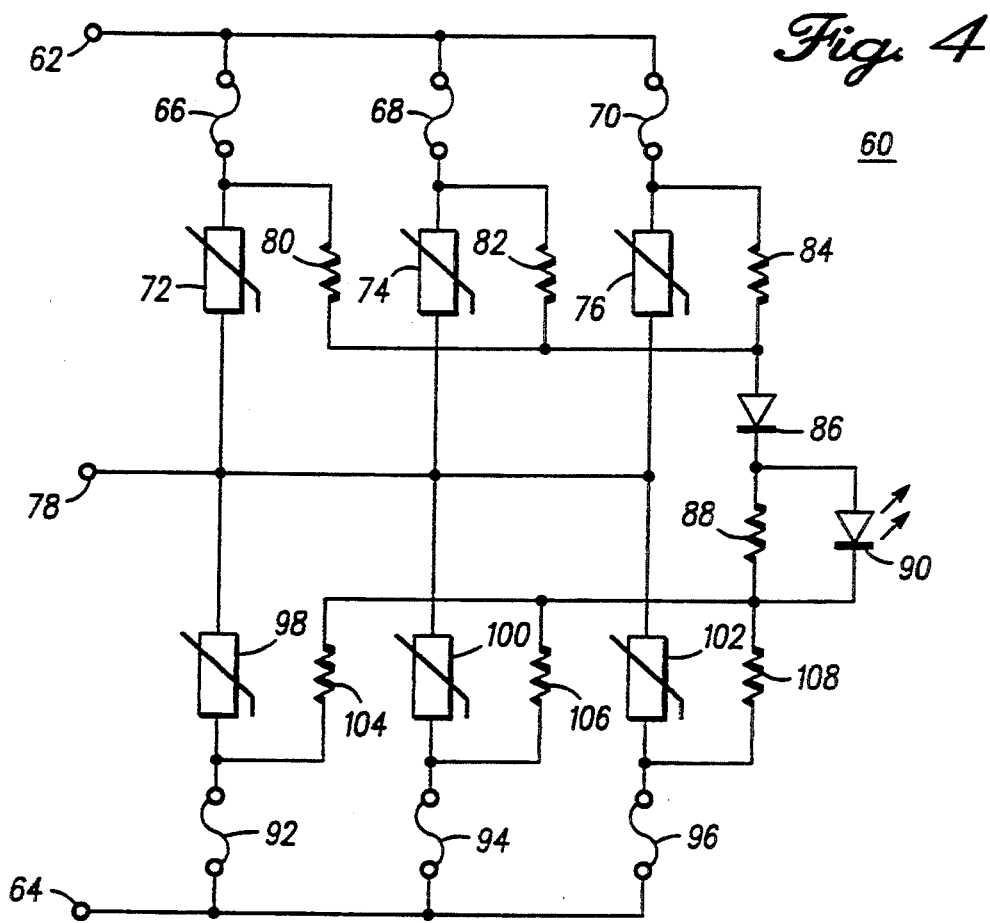
FIG. 4 is a schematic illustration of a surge arrester circuit in accordance with the present invention.

Referring now to FIG. 4, a surge arrester circuit is illustrated and generally designated as 60. The circuit 60 connects with two high potential lines through a first and second high potential terminal 62 and 64.

The first high potential terminal 62 connects to a first plurality of fuses 66, 68, and 70. Electrically connected in series with each fuse 66, 68, and 70 are a first plurality of varistors 72, 74, and 76. Each fuse like 66 is paired in series with a corresponding varistor like 72. The opposite end of the varistors 72, 74, and 76 are connected to a low potential terminal 78. The low potential terminal 78 connects to the low potential side of the power system. Each pair of the first plurality of fuses like 66 and first plurality of varistors like 72 are electrically connected in parallel to one another.

A first plurality of resistors 80, 82, and 84 corresponds to the first plurality of varistors and fuses. Each resistors like 80 connects between the fuse 66 and varistor 72. The opposite end of each resistor like 80 connects to a diode 86. The diode 86 connects to a resistor 88 and a light emitting diode 90 electrically connected to one another in parallel.

Similarly, the second high potential terminal 64 connects to a second plurality of fuses 92, 94, and 96. Electrically connected in series with each fuse 92, 94, and 96 are a second plurality of varistors 98, 100, and 102. Each fuse like 92 is paired in series with a corresponding varistor like 98. The opposite end of the varistors 98, 100, and 102 are connected to the output terminal 78. Each pair of the second plurality of fuses like 92 and second plurality of varistors like 98 are electrically connected in parallel to one another.

A second plurality of resistors 104, 106, and 108 corresponds to the second plurality of varistors and fuses. Each resistor like 104 connects between the fuse 92 and varistor 98. The opposite end of each resistor like 104 connects to the resistor 88 and a light emitting diode 90 electrically connected to one another in parallel.

The means of monitoring the status condition of the circuit 60 utilizes the first and second plurality of resistors, diode 86, resistor 88, and the light emitting diode 90. The resistance ladder of the first plurality of resistors 80, 82, and 84 monitor the fuses 66, 68, and 70 on one line and the second plurality of resistors 104, 106, and 108 monitor the fuses 92, 94, and 96 on the second line. Both lines develop a voltage across resistor 88 that is proportional to the number of conducting fuses 66, 68, 70, 92, 94, and 96. Only when a preselected number of these fuses are intact will sufficient voltage be available to forward to forward bias the knee of the light emitting diode 90 and signal the operating status of the circuit 60.

The present invention contemplates using other means for monitoring the status condition of the circuit 60. For example, an optical isolator can be electrically connected in series with the light emitting diode 90 or can replace it. The optical isolator can further be connected to remote warning circuitry.

The term varistor as used herein describes any voltage dependent non-linear resistor or element whose resistance value varies with the voltage across it. Preferably, the varistors are metal oxide varistors utilizing zinc oxide.

The following Examples are set forth for the purposes of illustration and should not be construed as limiting.

EXAMPLES

Two-pole surge arresters were constructed to protect each line on a standard 120/240 volt service. The housings were made of thermoplastic material supplied by the General Electric Company designated as Noryl N190X File No. E121562 rated 94-5 V for 0.120 inch thickness. The component parts of the housings were ultrasonically welded together. The footprint of the housings were shaped to fit the panelboards made by the Square D Company and designated as QO line and Homeline panelboards (registered trademarks of the Square D Company). Typical dimensions for the overall height/width/depth of the arresters were 2.84/1.48/3.69 inches and 2.59/1.98/3.69 inches.

Referring to FIG. 4, the varistors 72, 74, 76, 98, 100, and 102 were metal oxide varistors manufactured by the Matshusita Electric Industrial Company designated as type ERZ-C20DK271U (20K271U). Other UL recognized equivalents can be used for this component and the other components designated herein.

The fuses 66, 68, 70, 92, 94, and 96 are made of solid tinned copper bus bar wire Federal Spec. QQ-W-343, 30 AWG. A one inch loop is provided for each varistor between the line side and tie point of the varistor and associated resistor. Other fusing techniques may be employed.

The resistors 80, 82, 84, 104, 106, and 108 were made of carbon film with a value of 43 k 1/2 W. The resistor 88 was also made of carbon film with a value of 270 ohm ¼ W.

The lead wire connected to the low potential terminal 78 was an insulated solid copper Type THHN or UL-style 1015 rated 600 V at 105 degrees C. The length of the neutral wire varied from 12 to 18 inches for different models.

The light emitting diode 90 was supplied by Lumex Lites P/N SSL-LX5093LGD. The silicon diode 86 was 1N4005 with a 600 volt reverse breakdown.

The housing was filled with washed and dried silica crystal with an AFS grain fineness of 38. The housing was sealed with a low viscosity Stycast Epoxy supplied by Emerson and Cuming Inc. as P/N 2651MM.

The above constructed surge arresters snap into the circuit breaker slots of the commercially available breaker panels identified below. The arresters provide line-to-neutral or line-to-ground protection with a LED status indicator. The nominal varistor voltage tested at 1 mAdc is 270 V with 10% variance. The clamping voltage tested at 1.5 kA, 8/20 microseconds is 460 V; at 5 kA, 8/20 microseconds is 560 V; and, at 10 kA, 8/20 microseconds is 700 V. The surge life tested at 1.5 kA, 8/20 microseconds is over 2500 operations. The peak single pulse transient current at 8/20 microseconds is 27 kA.

The present invention is specifically disclosed for use with two pole breaker panels. The surge arresters described herein are designated by the Square D Company as Model QO2175SB compatible with Square-D QO panelboards and Model HOM2175SB compatible with Square-D Homeline panelboards.

As those skilled in the art will appreciate, the small size of the inventive surge arrester allows adaptation and configuration for usage with a wide variety of load centers, panelboards, and other electrical distribution devices. This allows upgrading the safety of devices already in the marketplace. The present invention is adaptable for use with one, two, and three pole breaker panels. The inventive surge arrester can provide line-to-neutral or line-to-ground protection.

It will be further understood that a different number of varistors can be used for each line. Likewise, the use of three varistors is for illustrative purposes only and not to be construed as so limiting.

The present invention provides parallel varistors which allows individual fusing and redundancy. Since the inventive surge arrester directly plugs into the panelboard, the lead inductance is significantly reduced. The inventive circuit offers a lower clamping level compared to the prior art.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A circuit for limiting voltage surges across a service line in an electrical distribution device, the circuit comprising:
   at least one high potential terminal being adapted for connecting to at least one corresponding high potential line;
   a low potential terminal being adapted for connecting to a low potential means;
   a plurality of varistors connecting in parallel to one another between each of said at least one high potential terminal and the low potential terminal;
   a plurality of fuses having a number of fuses equal to the number of varistors in the plurality of varistors, each fuse connecting in series to a different varistor of the plurality of varistors to form a one to one correspondence, each fuse opening the circuit therethrough upon failure of the varistor connecting in series therewith; and
   means for monitoring the status condition of the fuses, the monitoring means electrically connecting to the fuses.

2. The circuit of claim 1 wherein the circuit includes:

a plurality of high potential terminals being adapted for connecting to a corresponding plurality of high potential lines;

an additional plurality of varistors connecting in parallel to one another between each additional high potential terminal and the low potential terminal; and an additional plurality of fuses having a number of fuses equal to the number of varistors in the additional plurality of varistors, each fuse connecting in series with a different varistor of the additional plurality of varistors.

3. The circuit of claim 1 wherein the monitoring means includes a plurality of resistors having a number of resistors equal to the number of varistors, each resistor connecting between a different fuse and varistor, the other end of each resistor connecting to a status indicator, whereby the voltage available to the status indicator is proportionately decreased by the number of fuses open.

4. The circuit of claim 3 wherein the status indicator is a light emitting diode, one end of the light emitting diode connecting to the resistors and the other end to the low potential terminal.

5. The circuit of claim 4 wherein the monitoring means includes a diode connecting in series between each resistor and the light emitting diode.

6. The circuit of claim 4 wherein the monitoring means further includes a resistor connecting in parallel to the light emitting diode.

7. The circuit of claim 3 wherein the status indicator is an optical isolator.

8. The circuit in claim 1 wherein the plurality of varistors includes at least three varistors electrically connecting in parallel.

9. The circuit of claim 1 wherein each varistor is a metal oxide varistor.

10. A circuit for limiting voltage surges across a service line in a multiphase load center, panelboard or the like, the circuit comprising:
at least two high potential terminals being adapted for connecting to at least two corresponding high potential lines;
a low potential terminal being adapted for connecting to a low potential means;
a first plurality of varistors connecting in parallel to one another between the first high potential terminal and the low potential terminal;
a first plurality of fuses having a number of fuses equal to the number of varistors in the first plurality of varistors, each fuse connecting in series to a different varistor of the first plurality of varistors to form a one to one correspondence, each fuse opening the circuit therethrough upon failure of the varistor connecting in series therewith;
a second plurality of varistors connecting in parallel to one another between the second high potential terminal and the low potential terminal;
a second plurality of fuses having a number of fuses equal to the number of varistors in the second plurality of varistors, each fuse of the second plurality of fuses connecting in series to a different varistor of the second plurality of varistors to form a one to one correspondence, each fuse of the second plurality of fuses opening the circuit therethrough upon failure of the varistor connecting in series therewith; and means for monitoring the status condition of the fuses, the monitoring means electrically connecting to the fuses.

11. The circuit of claim 10 wherein the monitoring means includes a first and second plurality of resistors having a number of resistors equal to the number of varistors in the first and second plurality of varistors, each resistor of the first and second plurality of resistors connecting between a different fuse and varistor from the respective first and second plurality of fuses and varistors, each resistor connecting to a status indicator, the status indicator connecting between the first and second plurality of resistors, whereby the voltage available to the status indicator is proportionately decreased by the number of fuses open.

12. The circuit of claim 11 wherein the status indicator is a light emitting diode, one end of the light emitting diode connecting to each resistor of the first plurality of resistors and the other end connecting to each resistor of the second plurality of resistors.

13. The circuit of claim 12 wherein the monitoring means includes a diode connecting in series between each resistor of the first plurality and each resistor of the second plurality and the light emitting diode.

14. The circuit of claim 12 wherein the monitoring means further includes a resistor connecting in parallel to the light emitting diode.

15. The circuit of claim 11 wherein the indicator is an optical isolator.

16. The circuit in claim 10 wherein the first and second plurality of varistors each includes at least three varistors connecting in parallel to one another.

17. A surge arrester for use with a service line within an electrical distribution device, the surge arrestor comprising:
a housing made of an electrically insulating material, the housing having a base adapted for connection with the distribution device;
at least one high potential terminal being adapted for connection to at least one corresponding high potential line, each high potential terminal extending through the housing;
a low potential terminal being adapted for connecting to a low potential means, the low potential terminal extending through the housing;
a plurality of varistors being enclosed within the housing and connecting in parallel to one another between each high potential terminal and the low potential terminal;
a plurality of fuses being enclosed within the housing and having a number of fuses equal to the number of varistors in the plurality of varistors, each fuse connecting in series to a different varistor of the plurality of varistors to form a one to one correspondence, each fuse opening the circuit therethrough upon failure of the varistor connecting in series therewith; and
means for monitoring the status condition of the fuses, the monitoring means being enclosed within the housing with a display externally discernable.

18. The surge arrester of claim 17 wherein the surge arrester includes a current limiting arc suppression means being located within the housing and surrounding the plurality of fuses.

19. The surge arrester of claim 18 wherein the current limiting arc suppression means is an electrical grade silica.

20. The surge arrester of claim 17 wherein the surge arrester includes:
- a wire lead electrically connecting to the low potential terminal and the low potential means; and
- a pair of contact jaws connecting to each high potential terminal, the contact jaws being adapted for electrical and mechanical connection to a bus bar.

21. The surge arrester of claim 17 wherein the circuit includes:
- a plurality of high potential terminals being adapted for connecting to a corresponding plurality of high potential lines;
- an additional plurality of varistors connecting in parallel to one another between each additional high potential terminal and the low potential terminal; and
- an additional plurality of fuses having a number of fuses equal to the number of varistors in the additional plurality of varistors, each fuse connecting in series to a different varistor of the additional plurality of varistors.

22. The surge arrester of claim 17 wherein the monitoring means includes a plurality of resistors having a number of resistors equal to the number of varistors, each resistor connecting between a different fuse and varistor, the other end of each resistor connecting to a status indicator, whereby the voltage available to the status indicator is proportionately decreased by the number of fuses open.

23. The surge arrester of claim 22 wherein the status indicator is a light emitting diode, one end of the light emitting diode connecting to the resistors and the other end to the low potential means.

24. The surge arrester of claim 23 wherein the monitoring means includes a diode connecting in series between each resistor and the light emitting diode.

25. The surge arrester of claim 24 wherein the monitoring means further includes a resistor connecting in parallel to the light emitting diode.

26. The surge arrester of claim 22 wherein the status indicator is an optical isolator.

27. The surge arrester in claim 17 wherein the plurality of varistors includes at least three varistors connecting in parallel to one another.

28. The surge arrester of claim 17 wherein each varistor is a metal oxide varistor.

* * * * *